G. W. CLOUGH,

Assignor to G. E. HERRICK & W. C. NORTH.

VAPOR BURNER.

No. 9,922. Reissued Nov. 8, 1881.

Witnesses

J. H. Burridge

A. L. Avery

Inventor.

G. W. Clough

W. H. Burridge

Atty.

H. PETERS, Photo-Lithographer, Washington, D. C.

UNITED STATES PATENT OFFICE.

GEORGE W. CLOUGH, OF CLEVELAND, OHIO, ASSIGNOR TO GAMALIEL E. HERRICK AND WILLIAM C. NORTH, OF SAME PLACE.

VAPOR-BURNER.

SPECIFICATION forming part of Reissued Letters Patent No. 9,922, dated November 8, 1881.

Original No. 188,283, dated March 13, 1877; Reissue No. 9,602, dated March 8, 1881. Application for reissue filed August 22, 1881.

*To all whom it may concern:*

Be it known that I, GEORGE W. CLOUGH, of Cleveland, in the county of Cuyahoga and State of Ohio, have invented new and useful Improvements in Vapor-Burners, of which the following is a description.

To enable others to make and use the same reference will be had to the accompanying drawings, making part of this specification.

The invention consists in such parts and combinations as will be hereinafter more fully set forth and claimed for heating purposes.

Figure 1:
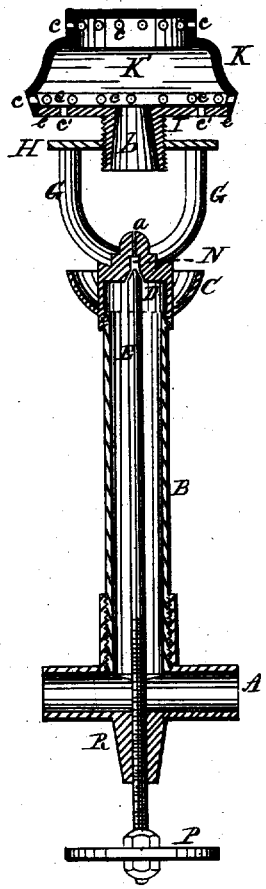
Figure 4:
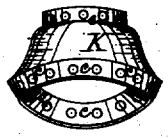
Figure 3:
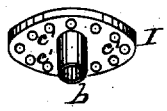
Figure 2:
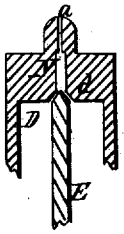

In the drawings, Figure 1 represents a vertical section of a vapor-burner embodying my invention. Fig. 2 is an enlarged view of that part of the burner embracing the expansion-chamber and valve. Fig. 3 is a detached view of the base or adjusting plate. Fig. 4 is a detached view of the perforated cap or dome.

Like letters refer to like parts in the several views.

In the drawings, A is a pipe which leads to and is connected with an elevated reservoir, (not shown in the drawings,) whence the gasoline or hydrocarbon fluid comes for burning in the ordinary well-known manner. To the said pipe A is connected the vertical tube B, the upper part of which forms the vaporizing-chamber D, Fig. 1. Around said part of the tube is placed the heating-cup C. Above the vaporizing-chamber is situated the expansion-chamber N, from which leads the passage or outlet *a*. The said chamber is beveled or funneled at the lower part, as shown at *d*, Fig 2, and the angle of the bevel is made to correspond with the tapering end of the screw-pin valve E, so as to secure a tight and close fit to prevent leakage. The lower part of the said valve-rod is screw-threaded and works in the female screw in the projection R. Said rod is provided with a hand-wheel, P, or other suitable device, by which the supply of the vaporized fluid is regulated.

H is a top plate, provided with a central opening, and is supported on the arms G G, which rise from the upper part of the vaporizing-chamber D, and admits of a free open space between the outlet *a* and the burner, for the purpose of securing combustion.

The adjusting-plate I is provided with a depending guide-pipe, *b*, screw-threaded on the outside, whereby, in connection with the threaded opening of the top plate, the said adjusting-plate I can be elevated or lowered relatively to said top plate. The pipe *b* is situated directly over the outlet *a*, from whence the vaporized fluid passes through said pipe into the perforated combustion cap or dome K. The plate I is also provided with openings or jet-apertures. The perforations or openings are seen at *c c'*. The object in making the plate I adjustable is to secure a blue or heating flame. This desired result can be reached in all instances with my improvement by simply adjusting upward or downward the plate I, as circumstances may require.

K is the perforated cap of the combustion-chamber K'. It fits to the periphery or sides of plate I loosely, so that it can be taken off or removed when desired. The cap is fitted to the plate by means of a shoulder or flange on the lower edge of the cap, as seen in Fig. 1 at *e e*. One advantage thereby secured is that in case the opening or outlet *a* becomes clogged or stopped up, the instrument by which to clear it can be passed through the tube *b* from above in a line with the axis of outlet *a*, thus diminishing the liability of injury to the outlet, as well as facilitating its cleaning.

The combustion-chamber K' is formed by the interior of the cap K, and the floor or base thereof by the plate I. The upper section or dome is made without a floor or bottom and rests upon the plate I, to which it is removably connected, and the two sections or parts forming the chamber are held in place by a circular flange at the junction of the said sections, which holds and prevents lateral displacement of the sections.

Combustion-chambers have been made, from mere convenience of construction, of thin metal, in two parts, as in the patent to Love, February 8, 1870, No. 99,689; but he expressly states that the two parts are to be brazed together; also, in the patent to Marsh, September 6, 1870, No. 107,072, where the cap is struck up and then very tightly fitted to the lower part of the shell of the dome by means of a shoulder. In my cap and base the two parts are cast separately and made to fit sufficiently tight where they join, and the weight of the cap keeps it in place; but it can readily be removed at any time when required.

By means of the expansion-chamber N a steady and even flow of the vaporized fluid through the outlet *a* is secured, and any of the fluid which escapes vaporization in the chamber D and enters the expansion-chamber N is vaporized therein, so that by this improvement a thorough vaporizing of the gasoline or hydrocarbon fluid is secured.

The operation of the vapor-burner is as follows: Gasoline or hydrocarbon fluid enters the tube B by hydrostatic pressure. To light the burner, turn the wheel P so as to open the valve E. This will cause a jet of fluid to pass through the opening *a* into the combustion-chamber K′, striking against the roof or top thereof. The fluid will then run down into the cup C, and when it is about half full close the valve E to stop the flow. Then light the fluid in the cup and let it burn out. This operation heats the upper part of the tube B sufficiently to cause vaporization of the fluid to take place in the chamber D thereof. Now, when the valve is opened again, the vaporized fluid passes into the combustion-chamber and issues at the jet-openings *c c′*, where, when lighted, it burns with a blue flame, which can be regulated, as desired, by opening the valve more or less. The vaporizing fluid that passes from the interior of the cap K through the jet-apertures *c′* issues between the top plate, H, and the adjusting-plate I and burns with a blue flame, which flame surrounds the burner. The heat from the top plate, H, and from the burner is transmitted by the arms G G, and by radiation to the upper part of the tube B to a sufficient degree to continue the vaporization of the gasoline in the chamber D, which was secured in the first instance by the direct application of heat by means of the ignited oil in cup C.

Any number of these burners may be connected with and supplied by the same reservoir, limited, of course, only to the capacity of the latter.

The interior of the guide-pipe *b* is preferably made tapering, with the smaller end opening into the combustion-chamber K′.

A removable perforated cap of sheet metal has heretofore been used on illuminating-burners with a curved base, but such cap fitted the base so closely as to be practically immovable. My burner is so adjusted on the flange or base plate that it can readily be removed when either hot or cold. It is made of cast metal, and by making it of the form shown the use of a core in casting it is avoided, which had not been done in the manfacture of others. I thereby facilitate and cheapen the manufacture. This method of casting has particular advantages in this case, in that it secures a smooth interior surface, which has important relations to the perfection of the gas-burning perforations and to the matter of the deposit of soot and incrustation, as will be readily understood.

What I claim as my invention, and desire to secure by Letters Patent, is—

1. The removable perforated cap K, fitted on the base-plate, and in combination with said plate and with the guide-pipe and jet-orifice, substantially as and for the purpose described.

2. In combination with the vaporizing-chamber D, expansion-chamber N, and screw-valve E, the adjusting-plate I, guide-pipe *b*, and removable cap K, substantially as and for the purpose described.

3. The combination, with the vaporizing-chamber D, expansion-chamber N, and screw-valve E, of the adjusting-plate I, guide-pipe *b*, top plate, H, and removable cap K, substantially as described.

4. The combination, with vaporizing-chamber D, expansion-chamber N, screw-valve E, and heating-cup C, of the adjustable plate I, guide-pipe *b*, top plate, H, and removable combustion cap K, substantially as described.

5. The combination, with the vaporizing-chamber D, expansion-chamber N, screw-valve E, and heating-cup C, of the arms G G, adjusting plate I, guide-pipe *b*, top plate, H, and removable cap K, substantially as described.

6. A perforated cap, K, adjustable to a bottom or base plate, I, constructed as described, the two forming a combustion-chamber, substantially as and for the purpose set forth.

7. The combination of the removable perforated combustion-cap K with base-plate I and guide-pipe *b*, having a central opening arranged in relation to the gas-valve orifice, substantially as and for the purpose described.

8. A combustion-chamber made of two cast-metal sections, K and I, the upper one forming the dome or cap and the lower one the base or bottom thereof, and a guide-pipe communicating with said chamber, substantially as and for the purpose described.

In testimony whereof I affix my signature in presence of two witnesses.

GEORGE W. CLOUGH.

Witnesses:

J. H. BURRIDGE,

A. L. AREY.